United States Patent [19]

Hertell et al.

[11] Patent Number: 4,515,512

[45] Date of Patent: May 7, 1985

[54] SEAL FOR HIGH PRESSURE PUMP OR THE LIKE

[75] Inventors: Siegfried Hertell, Radevormwald; Artur Hager, RS-Lüttringhausen, both of Fed. Rep. of Germany

[73] Assignee: Barmag Barmer Maschinenfabrik AG, Remscheid, Fed. Rep. of Germany

[21] Appl. No.: 301,408

[22] Filed: Sep. 11, 1981

[30] Foreign Application Priority Data

Sep. 12, 1980 [DE] Fed. Rep. of Germany ....... 3034371
Mar. 17, 1981 [DE] Fed. Rep. of Germany ....... 3110241

[51] Int. Cl.³ .................. F04C 2/18; F04C 15/00; F16J 15/40; B29F 3/08

[52] U.S. Cl. .................................. 418/1; 418/2; 418/81; 418/100; 418/102; 418/104; 418/206; 277/59; 425/376 B

[58] Field of Search ............... 418/1, 2, 77, 81, 100, 418/102, 104, 205, 206; 277/15, 59, 135; 264/176 F, 176 R, 101; 425/203, 376 B

[56] References Cited

U.S. PATENT DOCUMENTS

| 1,706,829 | 3/1929 | Thomson . | |
|---|---|---|---|
| 1,841,863 | 1/1932 | Van Rijswijk | 277/15 |
| 2,369,249 | 2/1945 | Rainalter | 418/206 |
| 2,756,684 | 7/1956 | Renzo | 418/102 |
| 2,823,616 | 2/1958 | Toyoda . | |
| 2,853,020 | 9/1958 | Hollinger . | |
| 3,131,939 | 5/1964 | Cuny | 277/15 |
| 3,415,527 | 12/1968 | Ginther | 277/59 |
| 3,450,052 | 6/1969 | Turner . | |
| 3,552,875 | 1/1971 | Bond, Jr. | 277/59 |
| 3,894,741 | 7/1975 | McHugh | 277/59 |
| 3,948,590 | 4/1976 | Gelin | 418/81 |
| 3,975,123 | 8/1976 | Schibbye | 418/102 |
| 4,265,547 | 5/1981 | Martin | 425/203 |

FOREIGN PATENT DOCUMENTS

| 677016 | 7/1966 | Belgium . | |
|---|---|---|---|
| 471012 | 3/1929 | Fed. Rep. of Germany . | |
| 1528965 | 10/1969 | Fed. Rep. of Germany | 418/206 |
| 2436222 | 2/1975 | Fed. Rep. of Germany . | |
| 2557311 | 6/1977 | Fed. Rep. of Germany | 418/206 |
| 746768 | 6/1933 | France . | |
| 821321 | 12/1937 | France . | |
| 29137 | of 1913 | United Kingdom | 418/206 |

Primary Examiner—John J. Vrablik
Attorney, Agent, or Firm—Bell, Seltzer, Park & Gibson

[57] ABSTRACT

A seal for the drive shaft of a gear pump for melted polymeric materials is provided, which includes a reduced pressure zone, a mechanical packing seal, and a liquid filled chamber positioned in succession along the drive shaft. The liquid is a solvent for the polymeric material, and it is maintained under a pressure slightly above that in the reduced pressure zone. Thus a small quantity of the liquid tends to move axially into the reduced pressure zone where it dissolves any polymeric material leaking thereinto. A failure of the seal may be readily detected by monitoring the volume of the liquid, since any polymeric material leaking axially through the packing seal will be dissolved by the liquid in the chamber, thereby increasing the volume of the liquid.

28 Claims, 7 Drawing Figures

SEAL FOR HIGH PRESSURE PUMP OR THE LIKE

The present invention relates to a seal for the drive shaft of a discharge or metering pump of the type adapted to convey a melted polymeric material.

In the production and processing of thermoplastics and other polymeric materials, such as polyamides, polyethyleneterephtalate, polypropylene, and polystyrene (note for example, Chemiefasern 1980, Volume 9, Page 670), discharge or metering pumps are commonly employed which feed the melt at substantial pressures, of up to more than about 300 bar. Most commonly, discharge pumps of the described type are gear pumps. A special problem of these discharge pumps is found in sealing the drive shaft in the pump housing. Sealing liquids have been used for this purpose, which are delivered into the stuffing box under high pressure. However, leakage can only be reduced in the area of the seal by this procedure, since the pressure of the sealing liquid must be less than the pressure of the melt, so as to maintain a pressure gradient from the pump chamber to the outside.

While the quantity of such leakage may be insignificant, it nevertheless presents a significant problem when the melt cools and solidifies, or when the emerging melt comes into contact with the bearings and seals, and thereby causes an increased wear.

It is accordingly an object of the present invention to provide a seal for the drive shaft of a pump which is adapted to convey a melted polymeric material, and which is characterized by the substantial absence of leakage between the drive shaft and pump housing.

This and other objects and advantages of the present invention are achieved in the embodiment illustrated herein by maintaining a sealing liquid in an annular chamber between the rotating shaft and housing, with the liquid being capable of dissolving the polymer being processed, even in a cooled condition. Suitable solvents include glycol (e.g., tetraethylene glycol) for polyamides, and butanediol or glycol for polyesters. It is within the scope of knowledge of a chemist ordinarily skilled in the art to find suitable solvents for other polymers to be processed, such as for polypropylene and polystyrene.

Using a solvent for the polymer as a sealing liquid provides a significant advantage in that any leakage of melted polymer is not able to cause damage to the seals, since the sealing liquid maintains the leakage polymer dissolved. In addition, no harm will be done when small quantities of the sealing liquid reach the interior of the pump, since the solvent blends with the polyermic melt to form a homogeneous mixture and is dissolved. For this reason, it is preferred that the sealing area is reduced in pressure, which is preferably done by connecting the sealing area to the suction side of the pump via a duct. When a discharge pump is used to deliver the melt from a reactor container, a pressure below that of the outside surroundings may develop in the sealing area, so that there is a pressure drop from the outside to the inside, assuming, as has further been proposed to be advantageous, the sealing liquid is under a pressure which slightly exceeds the suction pressure of the pump.

The sealing liquid is supplied to the seal in such a manner that the shaft is primarily sealed in a stuffing box housing by a mechanical seal, and the sealing liquid is disposed in an annular chamber following the mechanical seal between the shaft and housing. Advantageously, a stuffing box packing, which is known to be sturdy, may be used as the mechanical seal. In a specific embodiment of the invention, two axially spaced apart mechanical seals are provided, each being composed of a stuffing box packing. The sealing liquid is disposed in the annular chamber formed between the two stuffing box packings. The stuffing box packings are supported against each other across the annular chamber by springs, so that both stuffing box packings can be axially stressed and loaded from the side facing of the shaft end. In this case, the stuffing force is transmitted from one packing to the other by the interconnecting springs.

Preferably, springs with a limited travel stroke are used in the liquid filled chamber. This may be accomplished by means of a post which is located in each spring, and which is shorter than the spring by a predetermined distance. The use of such springs is advantageous in that the seal continues to be operative even when the pressure release of the seal as provided by the invention, fails. Such a failure may occur for example when the pressure release duct as hereinafter described becomes clogged by melt which has solidified therein. In such case, the stuffing box packing adjacent the gear is subjected to the increased pressure of the high pressure side of the discharge pump, and is thereby pressed toward and against the outer end of the shaft. The packing can move relatively easily against the spring force, but only by the allowed travel stroke. Subsequently, the stuffing box packing is again firmly held between the stuffing flange at the shaft end, which acts through the second or outer stuffing box packing and the posts limiting the travel stroke, and thus the packing is held tight.

The danger of a pressure build-up in the reduced pressure zone of the shaft seal is minimized by providing a scraper therein, which scrapes off possibly penetrating, stagnating and solidifying residue of the melt, and keeps such melt in motion. Alternatively, for the same purpose, the shaft and the bore of the stuffing box housing can be arranged eccentrically to each other in the sealing area, so that, in the installed position of the pump, a narrow gap is formed at the bottom. This gap provides an increased dynamic pressure at the bottom, which causes the melt to circulate in the lower area where the melt is most likely to accumulate. With this arrangement, i.e., where there is an eccentricity between shaft and bore, a release duct leading to the low pressure side of the pump is positioned in the upper area of the reduced pressure zone.

Since discharge pumps of the described type become hot during operation, it may be desirable to cool the sealing liquid, first to preserve the packings, and secondly to avoid a chemical decomposition of the sealing liquid.

The sealing liquid may be supplied to the annular chamber from a reservoir communicating therewith. The reservoir may be open, but should it be desirable for the sealing liquid to be under a somewhat higher pressure, the system of the reservoir and annular chamber could also be closed.

For the purpose of cooling the sealing liquid, it is preferred to connect the annular chamber to a descending line for the liquid supply, and to an ascending line for the removal of the liquid. This is done in such a manner that a natural circulation exists in the line system due to the differences in temperature.

According to a further aspect of the invention, sealing of the discharge pump may be monitored by monitoring the amount of the liquid to detect a build up of dissolved polymeric material therein. Specifically, in the case of an open system, the level of the reservoir may be monitored, or in the case of a closed system, the pressure of the system may be monitored. In this connection it should be noted that, when the pressure of the melt rises, the melt will tend to leak into the sealing area, reach the annular chamber containing the solvent, and be there dissolved. As a result, the solvent-polymer mixture increases in volume, which can be measured directly, or via the pressure increase connected therewith, and which may be utilized for generating an alarm signal, for example.

Some of the objects and advantages of the invention having been stated, others will appear as the description proceeds, when taken in connection with the accompanying drawings, in which—

Figure 1:
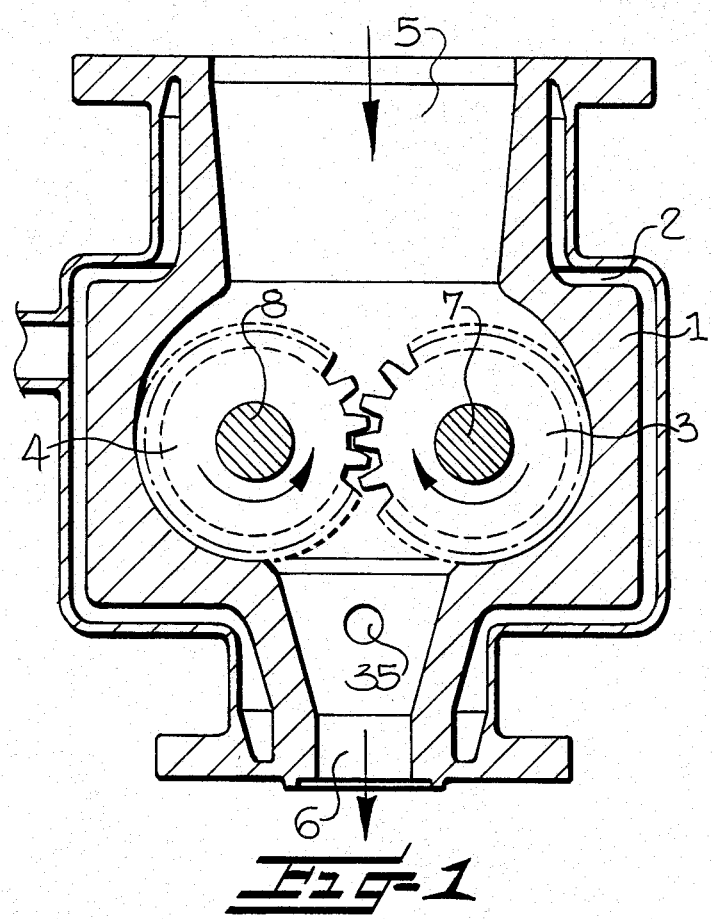
FIG. 1 is a schematic longitudinal section of a discharge pump, and specifically a gear pump, which embodies the present invention

Referring more particularly to the drawings, FIG. 1 illustrates the general construction of a gear pump embodying the present invention. The pump includes a housing 1 is surrounded by a fluid heating chamber 2. The heating fluid may be a heated fluid or vapor, which is adapted to condense on the walls of housing 1 and release the heat of condensation. Shaft 7 drives gear 3 of the two mating gears 3 and 4. The gears are fixedly mounted on shafts 7 and 8, respectively. According to the rotary direction of the gears as shown in the drawing, the gear pump feeds in direction of the arrows, so that the suction side of the pump is at 5 and the pressure side of the pump is at 6. A duct 35 communicates with the pressure side 6 of the pump and the bearing sleeves for the purposes set forth below. The right end of the shaft 7 as seen in FIG. 2 exits from the housing and is coupled with a drive motor (not shown).

Figure 2:
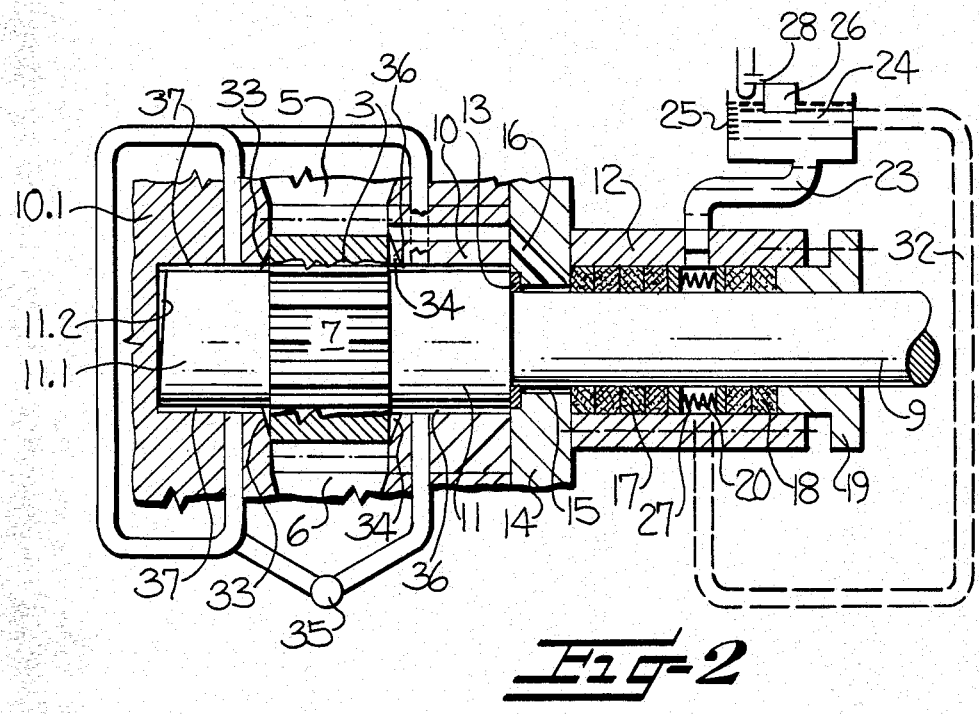
FIG. 2 is an axial section view of the pump shown in FIG. 1.
Figure 4:
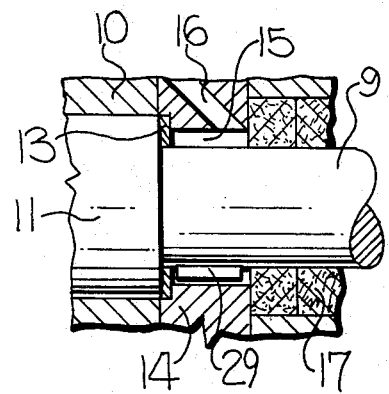
FIG. 4 is an enlarged fragmentary view of the reduced pressure zone of the seal as shown in FIG. 2.
Figure 5:
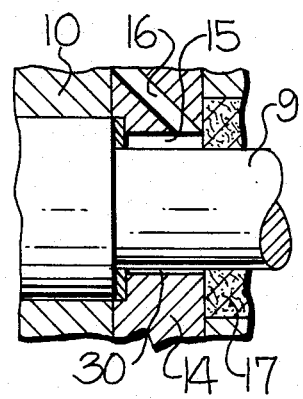
FIG. 5 is an enlarged fragmentary view of a modified reduced pressure zone.

FIGS. 2, 4 and 5 show in detail the bearings and the seal of drive shaft 7 in the area of drive shaft journal 9 in accordance with the preferred embodiment of the invention. In particular, FIG. 2 illustrates gear 3 which is mounted on drive shaft 7. Immediately to the right of gear 3 is the bearing portion 11 on shaft 7, which is housed in bearing sleeve 10. Immediately to the left of gear 3 is a bearing portion 11.1 on shaft 7 which is housed in bearing cover 10.1.

The shafts 7, 8 with gears 3, 4 are supported in bearing cover 10.1 or bearing housing 10 to absorb axial forces. In the illustrated embodiment, a ring 13 is provided between bearing housing 10 and housing cover 14, with the ring defining a gap of predetermined width between the bearing and the shaft seal, and thus a defined flow of leakage. Reduced pressure zone 15, which comprises an annular gap between the shaft 7 and housing cover 14, follows the bearing. The function of the reduced pressure zone 15 is to release the pressure of the leakage currents through a by-pass duct 16. By-pass duct 16 communicates between the zone 15 and the suction side 5 of the pump, and thus returns the leakage currents from the area of the zone 15 to the intake side 5 of the pump. The pressure of the melt in the zone 15, thus, essentially corresponds with the pressure on suction side 5 of the pump, plus the pressure loss in by-pass duct 16.

Figure 3:
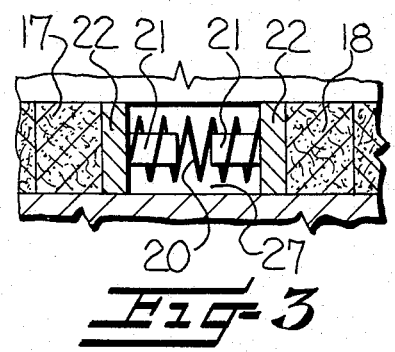
FIG. 3 is an enlarged fragmentary view of the liquid filled sealing chamber.

Shaft journal 9 of the drive shaft 7 is sealed toward the drive motor by stuffing box packings. For this purpose, a tubular stuffing box housing 12 is provided, which is mounted to the housing cover 14. The housing 12 contains a first stuffing box packing 17 composed of several gaskets, an annular chamber 27 which is bridged by several springs 20 in the axial direction, and a second stuffing box packing 18 with additional gaskets. Stuffing flange 19 axially compresses the gaskets from the direction of the driven end of the shaft, with the compressive forces being transmitted from packing 18 to packing 17 via springs 20. As can be seen in FIG. 3, the springs 20 are spaced circumferentially about the shaft 7 in the chamber 27, and are held between spring supports 22. Spring supports 22 include a pair of aligned posts 21 for each spring, which limit the free travel stroke and provide for a positive transmission of force when springs 20 are essentially fully compressed.

Line 23 connects annular space 27 to reservoir 24, which contains the sealing liquid, so that the sealing liquid in annular chamber 27 is only under the pressure of the column of liquid (head of liquid), i.e. under a pressure of slightly more than 1 bar, for example, 1.1 bar. Reservoir 24 has a measuring scale 25, and in addition a float 26, which, when the fluid has reached a certain level, closes electrical contacts 28 and thereby produces a signal.

FIG. 2 further indicates in dotted lines a natural circulation system for the sealing liquid. This system consists of reservoir 24, to which a descending line 32 is connected which leads to the bottom of the annular chamber 27. In approximately diametrical position therefrom, annular chamber 27 connects to an ascending line 23, which leads from the top of the chamber 27 to reservoir 24. Due to the temperature differences of the sealing liquid in the ascending and descending lines, and the resulting differences in density, a natural circulation develops in the system, with the sealing liquid being heated in annular chamber 27 and being able to cool in reservoir 24, to an extent depending on its capacity.

As has already been mentioned in the description of FIG. 1, a duct 35 leading to the bearing sleeves is connected on pressure side 6 of the pump. The melted polymer thus flows through this duct under a high pressure, via the connecting line system, and into axial grooves in the form of choking ducts 36, 37, which are arranged in bearing sleeve 10 and bearing cover 10.1, respectively. From here, pressure is applied to the annular surfaces 33 and 34 of the bearing sleeves or, alternatively, to the side surfaces of gear 3. Due to this action, the gear 3 "floats" between the axial boundary walls by reason of the symmetrical action of the forces, and contact with either one of the walls is avoided. Friction is thus reduced, and in connection therewith, the wear and required operating power are also minimized. With the described gap arrangement, the position of equilibrium of gear 3 is automatically restored as a function of the pressure loss in the choking ducts, i.e., when gear 3 is shifted to the right, the pressure drop in choking duct 37 increases due to the greater duct length, so that the pressure acting on annular surface 33 drops and gear 3 is shifted back to its position of equilibrium.

In the illustrated embodiment, the end of the shaft bearing portion 11.1 is beveled as shown at 11.2 in FIG. 2. This inclination of surface 11.2 from the normal plane causes a pumping effect when the shaft rotates, which acts to prevent a stagnation and decomposition of the melt which reaches this area, and it also results in a build-up of axial pressure against the shaft. To compensate for this additional axial pressure, the annular surface 33 is made smaller than the annular surface 34.

Figure 4A:
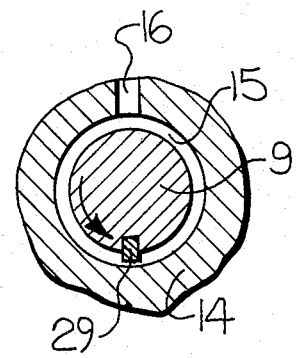
FIG. 4a is an end section view of the structure shown in FIG. 4.
Figure 5A:
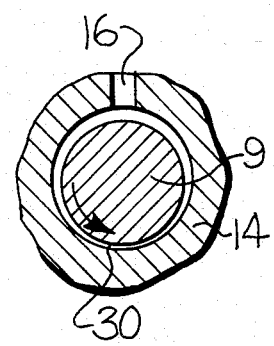
FIG. 5a is an end section view of the structure shown in FIG. 5.

FIGS. 4 and 5 illustrate two constructions for avoiding the build up of the melt in the dead space in the reduced pressure zone 15, and in particular the lower portion of zone 15. For this purpose, FIGS. 4 and 4a illustrate a scraper 29 on shaft journal 9 in the area of the zone 15. This scraper acts to prevent the melt from solidifying when the shaft rotates. FIGS. 5 and 5a provide an alternative, in that the housing cover 14 eccentrically surrounds shaft journal 9 in the area of zone 15, so that a narrow gap is formed at the bottom at 30. Due to the rotation of shaft journal 9, an increased dynamic pressure develops in the area of this narrow gap 30, which pressure contributes to a flushing of the gap 30 so as to avoid any solidification of the melt. The remaining numerals in FIGS. 4 and 5 relate to the other elements of the discharge pump shown in FIG. 2 and as described above.

Before describing the function of the discharge pump, it should be noted that the sealing liquid used according to the invention, preferably is a solvent for the polymer to be discharged. A person skilled in the art can readily select suitable solvents for any polymer which may be processed. Since during its life, the discharge pump is generally used only for a single polymer, only one solvent is employed. A particularly positive benefit, according to the invention, resides in the fact that the sealing liquid is not under significant pressure and, therefore, there is little risk of leakage of the sealing liquid. It should also be noted that the liquid filled reservoir 24 may be closed. In this case, the float 26 would be replaced by a pressure sensor, which emits a signal when a certain permissible pressure is exceeded.

The use of stuffing box packings ensures a good, adjustable seal which is not sensitive to contamination and has a long life. The pressure release of the melt in the area of zone 15 avoids a pressure drop of the melt in the direction toward the annular chamber 27. Rather, the sealing liquid exhibits a pressure gradient, albeit only slight, from annular chamber 27 toward the zone 15, so that small quantities of the sealing liquid may penetrate to the melt. These small amounts of sealing liquid cause the reside of the melt which may have reached stuffing box packing 17 to be dissolved and constantly removed. Thus it is accomplished that the stuffing box packings are constantly cleaned and kept operative. In particular, the possible solidification and disintegration of the melt into the area of the stuffing box packings is avoided, to thereby prevent deterioration of the packings.

In the event the pressure of the melt in the area of the zone 15 rises, as might be caused by sediments of the melt in the area of zone 15, or by a clogged by-pass duct 16, a small amount of the melt may penetrate through stuffing box packing 17 and into annular chamber 27, where it is dissolved in the liquid. Alternatively, the stuffing box packing 17 may then be shifted to the right against the force of springs 20 as seen in FIG. 2. In either case, the liquid height in reservoir 24 will change. This change in filling height can be read on scale 25 and is recorded via float 26 and contacts 28 or, in the case of a closed reservoir, by a pressure switch. The resulting signal can produce a shutdown to permit an overhaul of the pump. However, even in the event of such increased pressure in the zone 15, the pump will not leak. Rather, since the travel stroke of springs 20 is limited by pins 21, an increased stuffing force is also exerted on packings 17 and 18. Thereby, the sealing effect of the stuffing box packings is increased by the increased pressure. The pump can thus remain in operation until the entire plant for the production or processing of plastics is shut down routinely or for other reasons.

In the drawings and specification, there has been set forth a preferred embodiment of the invention and although specific terms are employed, they are used in a generic and descriptive sense only and not for purposes of limitation.

That which is claimed is:

1. A method of sealing the drive shaft in the housing of a gear pump or the like, and which is adapted to convey melted polymeric materials, and comprising the steps of
   feeding a heated and melted polymeric material to the pump, while
   rotating the drive shaft to convey the material through the pump under a relatively high pressure, while
   supplying heat to the pump to maintain the heated and melted condition of the polymeric material,
   maintaining an annular zone of relatively low pressure between the drive shaft and housing adjacent the inner end of the shaft, maintaining an annular packing seal between the shaft and housing immediately adjacent the outer side of said low pressure zone, maintaining an annular liquid filled chamber between the shaft and housing immediately adjacent the outer side of said packing seal, with said liquid in said chamber being a solvent for the polymeric material, and maintaining the liquid in the annular chamber at a pressure greater than the pressure in the low pressure zone.

2. The method as defined in claim 1 comprising the further step of maintaining an annular packing seal between the shaft and housing axially on the outer side of said liquid filled chamber.

3. The method as defined in claim 1 comprising the further step of monitoring the amount of the liquid to detect a build up of dissolved polymeric material therein.

4. The method as defined in claim 1 wherein the pressure in said low pressure zone is maintained to generally correspond to the pressure of the material being fed to the pump.

5. A pump adapted to convey a melted polymeric material without significant leakage thereof, and comprising
   a housing having an inlet port and a discharge port,
   fluid delivery means rotatably mounted within said housing and adapted upon rotation to convey a melted polymeric material from said inlet port to said discharge port,
   a drive shaft extending through said housing and operatively connected to said fluid delivery means for transmitting rotational torque thereto, means for heating the housing to maintain the melted condition of the polymeric material, and means for sealing said drive shaft to said housing to effectively preclude leakage of the polymeric material therebetween, said sealing means comprising an annular reduced pressure zone surrounding said shaft immediately adjacent said fluid delivery means, a packing seal surrounding said shaft immediately adjacent the side of said reduced pressure zone opposite said fluid delivery means, an annular chamber surrounding an axial portion of said shaft immediately adjacent the side of said packing seal opposite said reduced pressure zone, and a liquid which is a solvent for a polymeric material filling said annular chamber.

6. The pump as defined in claim 5 wherein said liquid is selected from a group consisting of glycol or butanediol.

7. The pump as defined in claim 5 wherein said reduced pressure zone is connected to said inlet port by a duct extending therebetween, and such that the pressure in said reduced pressure zone generally corresponds to the pressure of the polymeric material in said inlet port.

8. The pump as defined in claim 7 wherein said sealing means further comprises a second packing seal surrounding said shaft immediately adjacent the side of said liquid filled chamber opposite said first mentioned packing seal.

9. A gear pump adapted to convey a melted polymeric material without significant leakage thereof, and comprising a housing having an inlet port and a discharge port,
a pair of cooperating gears rotatably mounted within said housing and adapted upon rotation to convey a melted polymeric material from said inlet port at a relatively low pressure to said discharge port at a relatively high pressure,
means for heating the housing to maintain the melted condition of a polymer being conveyed therethrough,
a drive shaft extending through said housing and operatively connected to one of said gears for transmitting rotational torque thereto, and
means for sealing said drive shaft to said housing to effectively preclude leakage of the polymeric material therebetween, said sealing means including
(a) an annular reduced pressure zone surrounding an axial portion of said shaft adjacent said one gear,
(b) an annular packing seal surrounding an axial portion of said shaft immediately adjacent the outer side of said reduced pressure zone,
(c) an annular liquid filled chamber surrounding an axial portion of said shaft immediately adjacent the outer side of said packing seal, and
(d) means for maintaining the pressure of the liquid in said annular chamber at least somewhat above the pressure in said reduced pressure zone, and
scraper means mounted on said shaft at said reduced pressure zone for engaging any melted polymeric material which may leak thereinto and preventing the solidification thereof.

10. The gear pump as defined in claim 9 wherein said pressure maintaining means includes a duct communicating between said reduced pressure zone and said inlet port of said housing.

11. The gear pump as defined in claim 10 wherein said pressure maintaining means further includes liquid reservoir means positioned to create a pressure head for the liquid in said chamber.

12. A gear pump adapted to convey a melted polymeric material without significant leakage thereof, and comprising a housing having an inlet port and a discharge port,
a pair of cooperating gears rotatably mounted within said housing and adapted upon rotation to convey a melted polymeric material from said inlet port at a relatively low pressure to said discharge port at a relatively high pressure,
a drive shaft extending through said housing and operatively connected to one of said gears for transmitting rotational torque thereto, and
means for sealing said drive shaft to said housing to effectively preclude leakage of the polymeric material therebetween, said sealing means including
(a) an annular reduced pressure zone surrounding an axial portion of said shaft adjacent said one gear, said reduced pressure zone including a cylindrical housing wall, with a portion of the outer surface of said shaft being located closer to the housing wall than the remaining portion of said shaft such that upon rotation the shaft tends to prevent the solidification of any melted polymeric material which may leak into said zone,
(b) an annular packing seal surrounding an axial portion of said shaft immediately adjacent the outer side of said reduced pressure zone, and
(c) an annular liquid filled chamber surrounding an axial portion of said shaft immediately adjacent the outer side of said packing seal.

13. The gear pump as defined in claim 12 wherein said shaft is coaxially disposed in said cylindrical housing wall of said reduced pressure zone, and said portion of said shaft which is located closer to the housing wall comprises scraper means which extends radially outwardly from the remaining portion of said shaft.

14. The gear pump as defined in claim 12 wherein said shaft is eccentrically disposed in said cylindrical housing wall in said reduced pressure zone, to thereby define said portion of the outer surface which is located closer to the housing wall.

15. A gear pump adapted to convey a melted polymeric material without significant leakage thereof, and comprising a housing having an inlet port and a discharge port,
a pair of cooperating gears rotatably mounted within said housing and adapted upon rotation to convey a melted polymeric material from said inlet port at a relatively low pressure to said discharge port at a relatively high pressure,
means for heating the housing to maintain the melted condition of a polymer being conveyed therethrough,
a drive shaft extending through said housing and operatively connected to one of said gears for transmitting rotational torque thereto,
means rotatably mounting said drive shaft in said housing and including a bearing portion on said shaft immediately adjacent said one gear and a bearing cover formed in said housing and surrounding said bearing portion, with said bearing portion and bearing cover defining an axially extending choking duct means therebetween,
duct means extending between said discharge port and said choking duct means, and means for sealing said drive shaft to said housing to effectively preclude leakage of the polymeric material therebetween, said sealing means including (a) an annular reduced pressure zone surrounding an axial portion of said shaft immediately adjacent the outer side of said bearing portion, (b) an annular sealing ring disposed about said shaft between said bearing portion and said reduced pressure zone and defining a predetermined gap and a defined flow of leakage therebetween, (c) an annular packing seal surrounding an axial portion of said shaft immediately adjacent the outer side of said reduced pressure zone, and (d) an annular liquid filled chamber surrounding an axial portion of said shaft immediately adjacent the outer side of said packing seal.

16. The gear pump as defined in claim 15 wherein said means rotatably mounting said drive shaft in said housing further includes a coaxial second bearing portion on said shaft on the side of said one gear opposite said first mentioned bearing portion, a bearing cover formed in said housing and surrounding said second bearing portion, with said second bearing portion and associated bearing cover defining an axially extending second choking duct means therebetween, and duct means extending between said discharge port and said second choking duct means.

17. The gear pump as defined in claim 16 further comprising means defining an annular gap between each side face of said one gear and said housing, with each of said annular gaps communicating with the adjacent one of said choking duct means and so that the melted polymeric material from said discharge port is supplied to each of said annular gaps.

18. The gear pump as defined in claim 17 wherein the one of said annular gaps which is at the side face of said one gear adjacent said first mentioned bearing portion is larger than the other annular gap.

19. The gear pump as defined in claim 15 further comprising duct means interconnecting said inlet port and said reduced pressure zone, such that the pressure in said reduced pressure zone generally corresponds to the pressure of said polymeric material at said inlet port.

20. The gear pump as defined in claim 15 wherein said means for sealing said drive shaft to said housing further includes means for maintaining the pressure of the liquid in said annular chamber at least somewhat above the pressure in said reduced pressure zone.

21. The gear pump as defined in claim 20 wherein said pressure maintaining means includes liquid reservoir means positioned to create a pressure head for the liquid in said chamber.

22. The gear pump as defined in claim 15 wherein said sealing means further includes a second annular packing seal surrounding an axial portion of said shaft immediately adjacent the outer side of said chamber.

23. The gear pump as defined in claim 22 wherein said sealing means further comprises spring means interposed in said chamber for transmitting an axial force thereacross.

24. The gear pump defined in claim 23 wherein said sealing means further comprises end closure means for engaging the free end of said second annular packing seal to exert an axial force toward said one gear and thus compact each of said packing seals.

25. The gear pump as defined in claim 24 wherein said spring means comprises a plurality of springs spaced circumferentially about said shaft, and a plurality of axially directed posts spaced circumferentially about said shaft for limiting the axial compaction of said sealing chamber from axial forces.

26. The gear pump as defined in claim 15 further comprising means for permitting the liquid to circulate through said chamber to permit cooling thereof and which includes a liquid reservoir positioned above said chamber, a first line extending from the top of said chamber to said reservoir, and a second line extending from the bottom of said chamber to said reservoir, whereby the elevated temperature of said liquid in said chamber causes a natural circulation of the liquid.

27. The gear pump as defined in claim 16 wherein said drive shaft includes an end which terminates in said housing, and said end includes a flat surface which is somewhat inclined with respect to a plane normal to the axis of the shaft, and which acts to prevent the build up of the polymeric material therebetween.

28. The gear pump as defined in claim 15 further comprising means for monitoring the amount of the liquid in said chamber to permit the detection of a build up of any dissolved polymeric material therein.

* * * * *